(12) United States Patent
Ogura et al.

(10) Patent No.: US 6,718,480 B1
(45) Date of Patent: Apr. 6, 2004

(54) COMMUNICATION PATH FAULT RESTORATION SYSTEM

(75) Inventors: Takao Ogura, Kawasaki (JP); Kohei Iseda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/533,481

(22) Filed: Mar. 23, 2000

(30) Foreign Application Priority Data

Mar. 25, 1999 (JP) .......................................... 11-081216

(51) Int. Cl.$^7$ ................................................ G06F 11/00
(52) U.S. Cl. .............................. 714/4; 714/43; 370/225; 370/228
(58) Field of Search ........................... 714/2, 3, 4, 40, 714/41, 43; 370/227, 225, 228

(56) References Cited

U.S. PATENT DOCUMENTS

| | | | | |
|---|---|---|---|---|
| 3,920,914 A | * | 11/1975 | Regnier et al. ............. | 370/228 |
| 6,023,452 A | * | 2/2000 | Shiragaki ..................... | 370/227 |
| 6,275,578 B1 | * | 8/2001 | De Trana et al. ........... | 379/229 |
| 6,308,282 B1 | * | 10/2001 | Huang et al. ................. | 714/4 |
| 6,314,525 B1 | * | 11/2001 | Mahalingham et al. ........ | 714/4 |
| 6,370,654 B1 | * | 4/2002 | Law et al. ..................... | 714/4 |

FOREIGN PATENT DOCUMENTS

JP          10-65686         3/1998

* cited by examiner

Primary Examiner—Nadeem Iqbal
Assistant Examiner—Tim Bonura
(74) Attorney, Agent, or Firm—Katten Muchin Zavis Rosenman (57) ABSTRACT

A communication path fault restoration system especially applicable to a multiple layered communication network is disclosed, in which spare paths are efficiently used between layers which, at the same time, perform the fault restoration process at high speed. A communication path fault restoration system for a communication network having a multiple layered structure comprises a communication path fault receiver 21 for detecting a faulty path according to the network collection information, a communication path restoration selector 22 for selecting a communication layer and the communication path on the layer for dynamically restoring the fault of the faulty path based on the determination of the information on the faulty path using a predetermined evaluation function, and a communication path restoration processing unit 23 for restoring the fault of the faulty path using the communication path on the selected communication layer.

18 Claims, 10 Drawing Sheets

5 VC4-AU4(150Mb/s)
6 VC3-TU3(50Mb/s)×3
COMMUNICATION PATH A
7 VC12-TU12(2Mb/s)×21

Fig.5B

| PATH NAME | TRANSMISSION RATE | UTILIZATION RATE |
|---|---|---|
| A | VC4-AU4 | 40 % |
| A-1 | VC3-TU3 | 20 % |
| A-2 | VC3-TU3 | 100 % |
| A-3 | VC3-TU3 | 19 % |
| A-3-1 | VC12-TU12 | 100 % |
| .... | | |

8 VP(PEAK CELL RATE)

Fig.6B

| PATH NAME | NUMBER OF PEAK CELLS |
|---|---|
| VP1 | 1000 CELLS |
| VP2 | 30000 CELLS |
| VP3 | 500 CELLS |
|  | ...... |
| TOTAL | 100 THOUSAND CELLS |

COMMUNICATION PATH FAULT RESTORATION SYSTEM

BACKGROUND OF THE INVENTION

1. Field of the Invention

The present invention relates to fault restoration in a communication path or, in particular, to a system and a method for restoring a fault in a communication path, having a multiple layered structure, in a communication network.

2. Description of the Related Art

Figure 1:
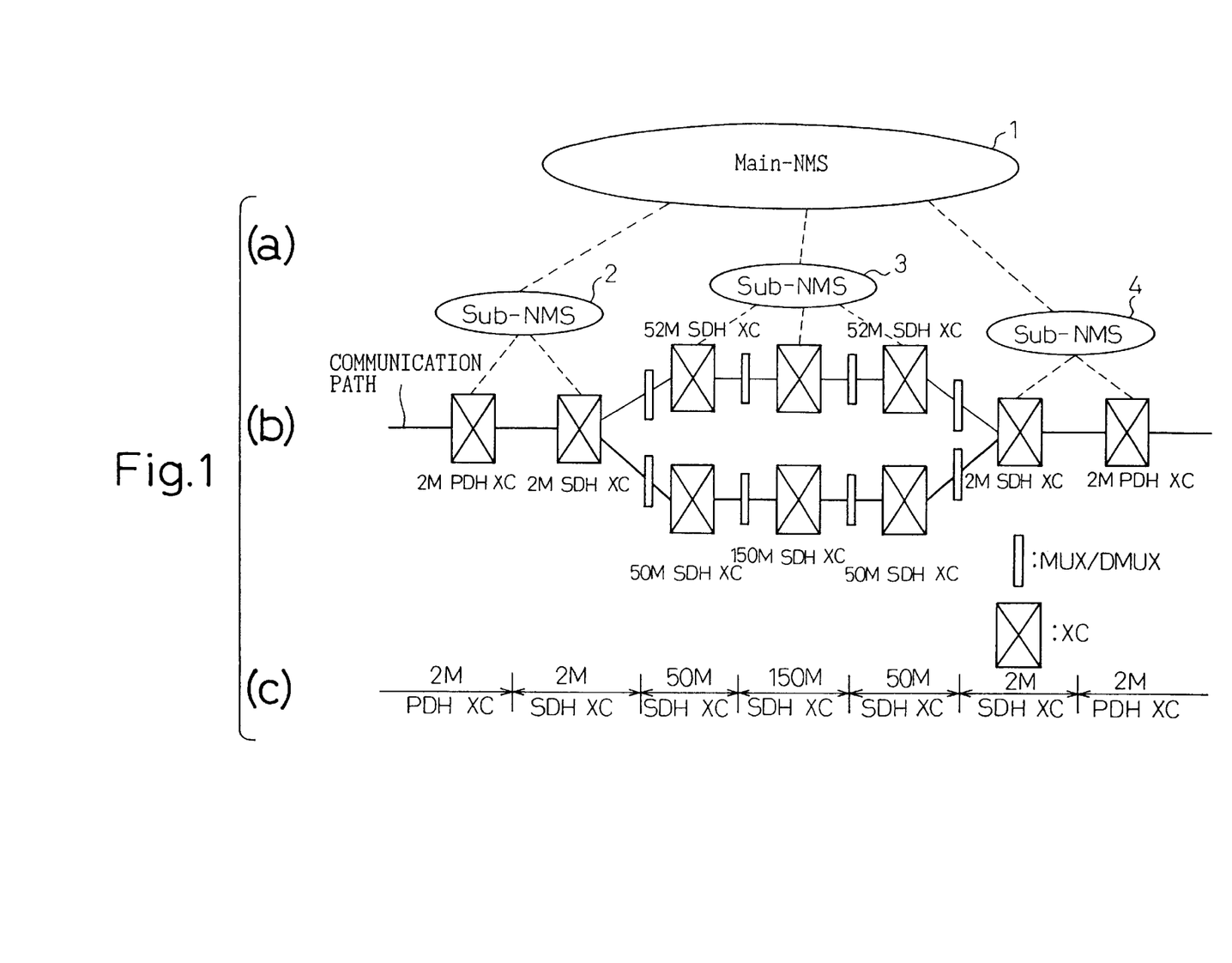
FIG. 1 is a diagram showing an example of the communication network configuration.
Figure 2:
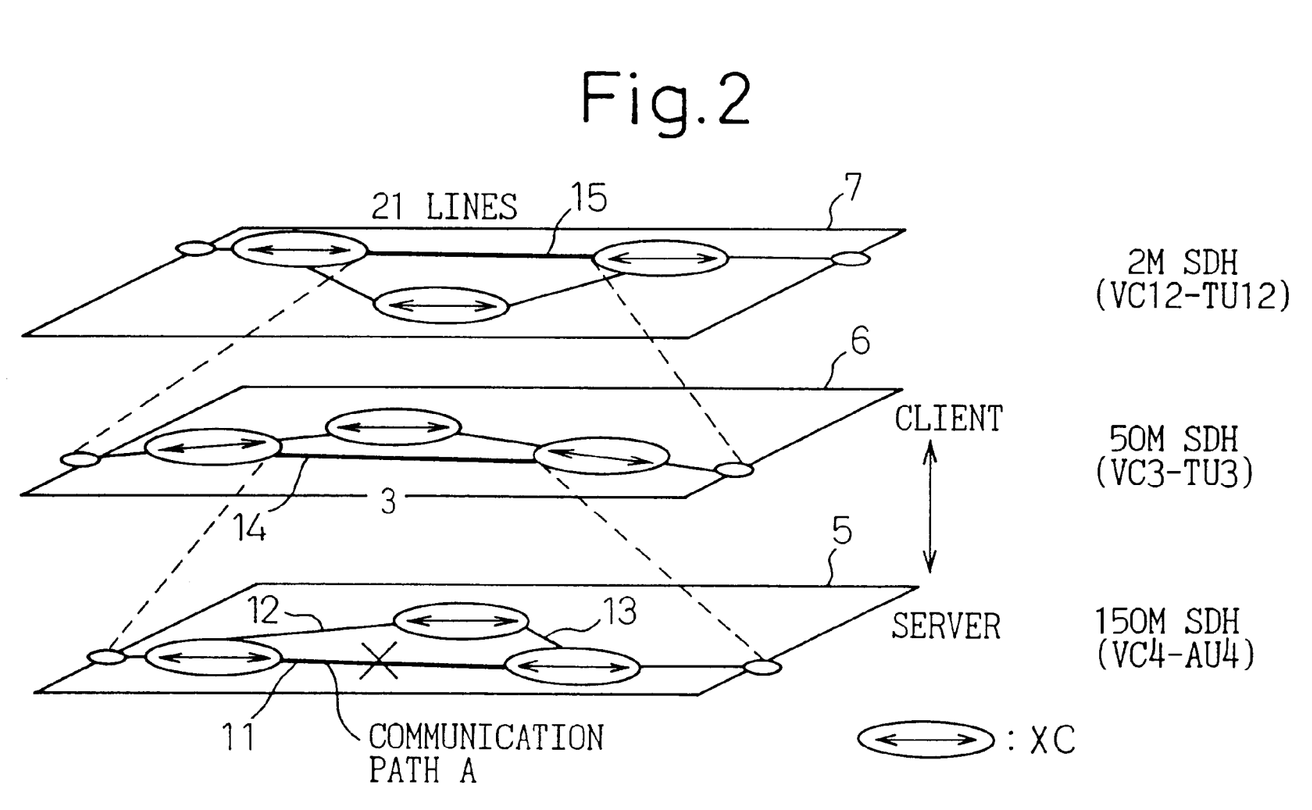
FIG. 2 is a diagram showing an example of the communication path of a multi-line structure.

FIG. 1 shows an example of the configuration of a communication network, and FIG. 2 an example of a multiple layered structure of a communication path in this network.

As shown by (b) in FIG. 1, communication equipment of various transmission types such as SDH, PDH and those shown by (b) in FIG. 1 exist on the communication network. These equipment are connected to each other by communication paths of various transmission speeds. These communication paths, as shown by (c) in FIG. 1 and FIG. 2, have layers 5 to 7 based on a multiple layered structure (2M_SDH, 50M_SDH, 150M_SDH, etc.) of the communication path.

In recent years, the communication network has become so complicated that it is divided into a variety of domains including the access network, the basic network, the PDH network and the SDH network. As shown by (a) in FIG. 1, each domain is managed by subnetwork management systems (Sub-NMS) 2 to 4 for managing the internal cross connect devices. These management systems are further managed by a main network management system (Main-NMS) 1. The ITU-T Recommendation G. 805 appears to be able to manage of these complicated communication paths from the viewpoint of a layered structure.

Assume that a fault such as a disconnection occurs in a communication path 11 (communication path A) of 150 Mb/s on the 150M_SDH layer 5 as shown by X in FIG. 2. In the prior art, for early restoration from the fault, an alternative path 12, 13 for the particular communication path is formed using spare paths in the same layer 5. In the case where the restoration in the same layer is impossible, the fault is restored using lower-speed paths such as 50 Mb/s or 2 Mb/s in the layers 6, 7 on the client side accommodating the faulty path.

As described above, in the prior art, a fault in a communication path, if it occurs in a layer of high transmission speed, is restored first in the same layer, and therefore a high-speed spare path is required to be laid in all communication paths in advance. Even in the case where the communication path 11 before the fault covers only 10% of the whole band, therefore, a spare path of the same speed, i.e. 150 Mb/s is required for forming an alternative circuit.

Also, the spare path of 150 Mb/s, once assigned to a fault of the communication path having the utilization of only 10% described above, cannot be assigned to another fault, if any, of a communication path requiring 80% of the whole band which could otherwise have been assigned to the particular spare path.

As described above, the prior art has the problem that the efficiency of the spare capacity design against a communication path fault is very low.

In the case where a fault cannot be restored in the same layer as described above, the fault restoration is tried using a low-speed path included in the high-speed path. In such a case, the need of laying a spare path in the high-speed layer is eliminated, and therefore the design efficiency of the spare capacity is improved. In the prior art, however, many paths in the low-speed layer must be restored for reuse which consumes a vast amount of time to increase the adverse effect of the fault.

SUMMARY OF THE INVENTION

In view of these various problems, the object of the present invention is to provide a communication path fault restoration system and method for a communication network, with the operating conditions thereof under constant change as the communication paths open or close, in which a layer having an optimum communication path for fault restoration and the particular communication path are appropriately selected by use of a predetermined evaluation function. As a result, the spare capacity design efficiency against a communication path fault is conspicuously improved and rapid fault restoration is made possible.

According to the present invention, there is provided a communication path fault restoration system for communication network having a multiple layered communication path, comprising a communication path fault receiving unit for detecting a faulty path according to the network collection information, a communication path restoration select unit for selecting a communication layer to dynamically restore a faulty path thereon and a communication path on the particular communication path based on the result of determination of the information related to the faulty path according to a predetermined evaluation function, and a communication path restoration unit for performing the process of restoring the fault of the faulty path using the communication path on the selected communication layer.

The communication path restoration select unit repeats the determination based on the evaluation function for the selected communication layer, and thereby selects a communication layer requiring the fault restoration of the faulty path and a communication path on the particular layer. The evaluation function also selectively determines whether the fault restoration process is performed within the same layer as the faulty path or using the path of a different layer accommodating the faulty path.

The evaluation function makes the foregoing determination according to the traffic utilization rate of the faulty path. In the case where the utilization rate is not higher than a predetermined threshold level, the fault restoration process in the path of the layer on client side is selected. The utilization rate includes the ratio in which the contract band of the user represents the whole band and the peak cell rate of the ATM communication. Further, in the case where the number of the paths required to restore on client side is not less than a predetermined value, the selection on the client side is invalidated and the fault restoration process is performed in the same layer as the faulty path.

Also, the evaluation function selects the path on the server side when the number of faults occurring in a plurality of paths exceeds a predetermined value.

The communication path restoration select unit further includes an alternative path construction possibility information and, in the case where this alternative path construction possibility information is negative, the evaluation function selects another layer. The communication path restoration select unit further includes the priority information assigned to each path, and the evaluation function selects the processing of a communication path fault high in the priority order in the same layer.

BRIEF DESCRIPTION OF THE DRAWINGS

The present invention will be more clearly understood from the description as set forth below with reference to the accompanying drawings, in which.

DESCRIPTION OF THE PREFERRED EMBODIMENTS

Figure 3:
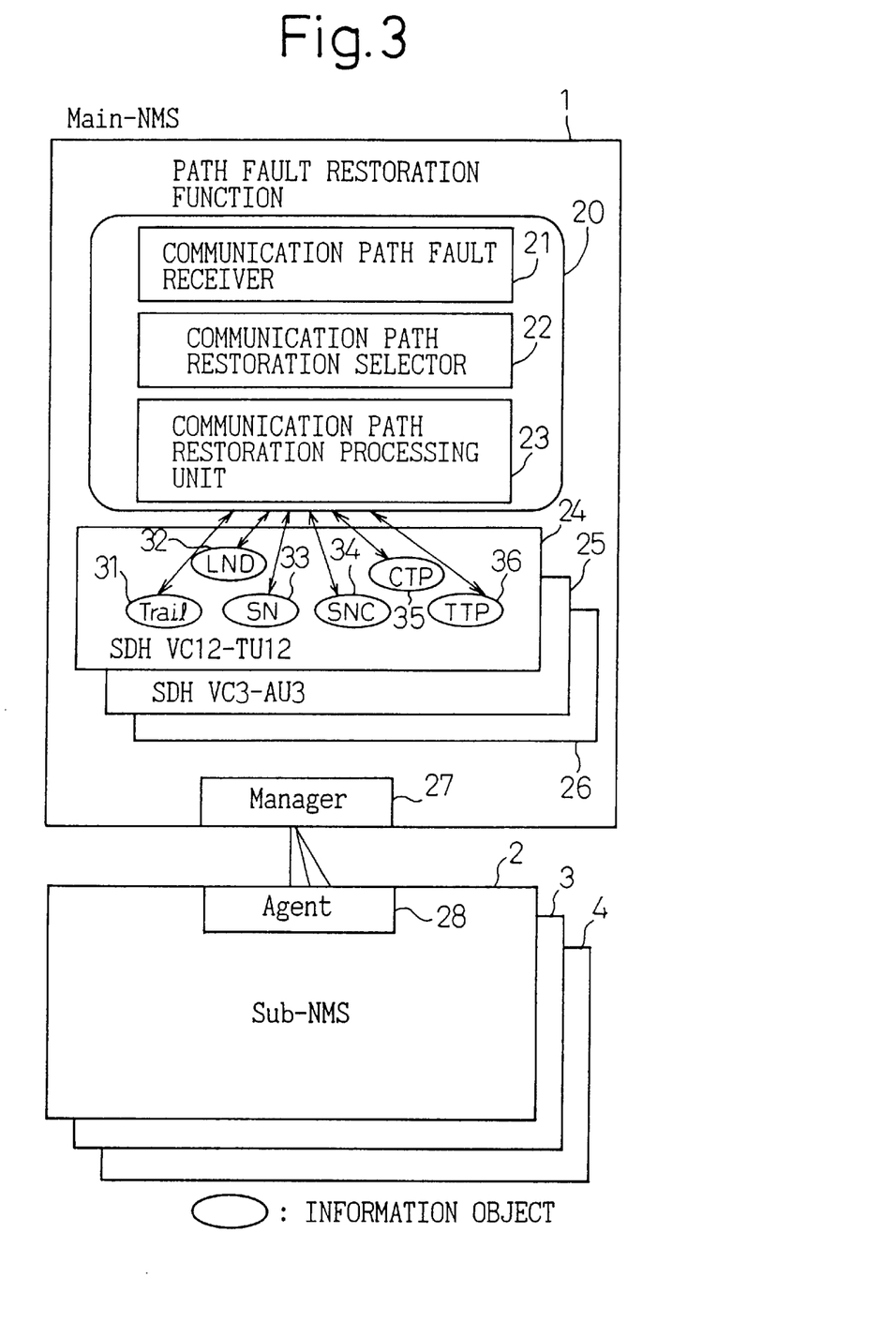
FIG. 3 is a diagram showing a basic configuration example of a communication path fault restoration system according to the invention.

FIG. 3 shows a basic configuration example of a communication path fault restoration system according to the invention.

In FIG. 3, the function of the communication path fault restoration system according to the invention is included in a path fault restoration function unit 20 in a main network management system (Main-NMS) 1. The main network management system 1 is connected to a plurality of subnetwork management systems (Sub-NMS) 2 to 4, between which communication is established by the manager 24 of the former and the agent 25 of the latter.

The main network management system 1 collects the network information from the subnetwork management systems 2 to 4, issues a cross connect control instruction for the subnetworks or otherwise controls and manages the whole network. This function is implemented, roughly speaking, by two objects including a function object (corresponding to 21 to 23 in this case) for performing the control of the network and information objects 31 to 36 for managing the network information.

The function object is processed by the path fault restoration function unit 20 according to the invention, while the information object is processed in the layer units 24 to 26 corresponding to the transmission rates of SDH_VC12-TU12, SDH_VC3-AU3, etc. Instead of one function object managing all the layers as in this case, a plurality of function objects can be arranged for the respective layer units to manage each layer separately.

Figure 4:
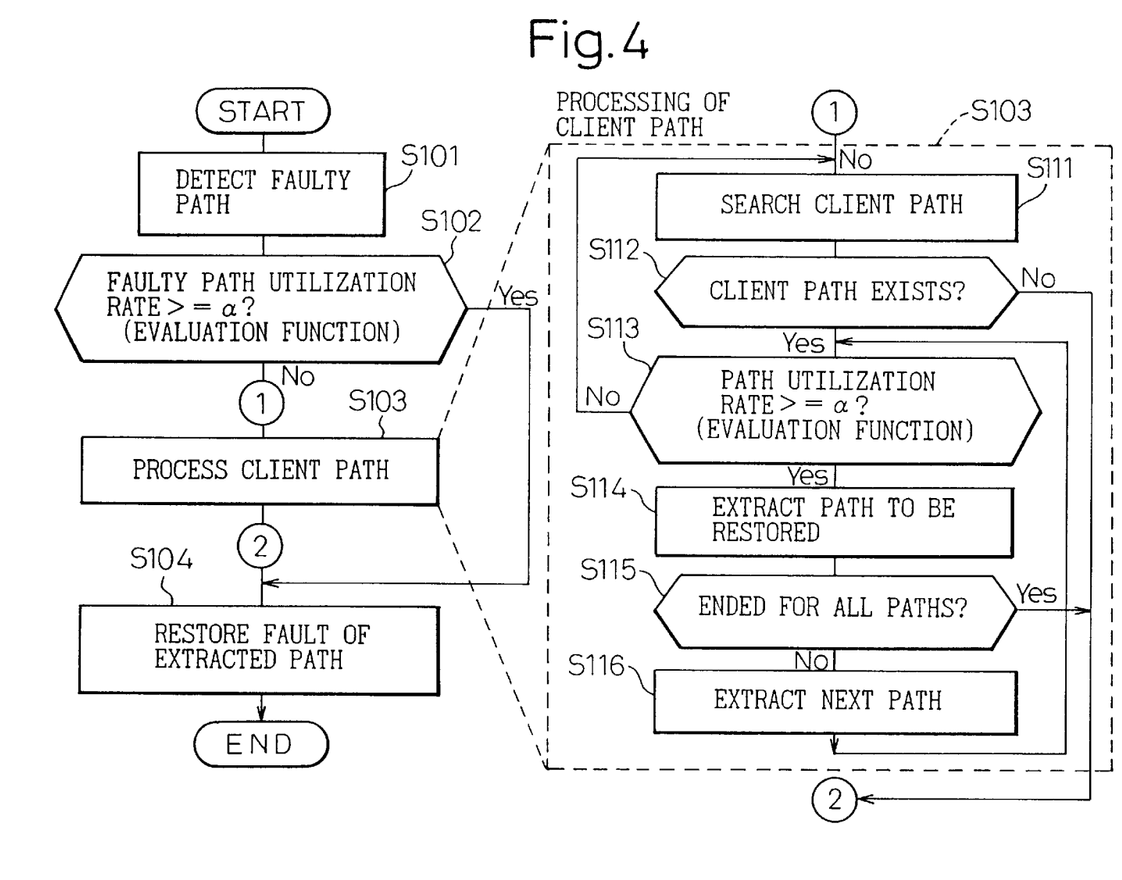
FIG. 4 is a diagram showing an example of the basic flow of fault restoration control according to the invention.

FIG. 4 shows an example of the basic flow of the fault restoration control according to this invention.

The operation of the communication path fault receiving unit 21, the communication path restoration select unit 22 and the communication path restoration processing unit 23 of the path fault restoration function unit 20 in FIG. 3 will be explained with reference to this control flow.

First, the communication path fault receiving unit 21 detects a faulty path based on the network information collected from the subnetwork management systems 2 to 4 (S101). The communication path fault that has occurred in the subdomains 2 to 4 is notified, by the agent 28 of the corresponding subnetwork management system, to the manager 27 of the main network management system.

Then, the communication path restoration select unit 22 selects a spare path and a layer having the spare path based on a predetermined evaluation function according to the invention. As a result, the select processing is not started from a predetermined spare path or a predetermined layer as in the prior art but, according to the invention, a spare path estimated to be optimum at the time point of occurrence of the communication path fault and a layer having the particular spare path are immediately selected regardless of the layer in which the fault has occurred (S102 and S103).

Thus, the communication path restoration processing unit 23 instructs the agent 28 of the corresponding subnetwork management system through the manager 27 to set a spare path for the layer selected based on the evaluation function and to perform the fault restoration process (S104). FIG. 4 shows also the case of using a "fault path utilization rate" as a specific example of the evaluation function (S103). This will be explained again with reference to the embodiments of the invention.

Figure 5A:
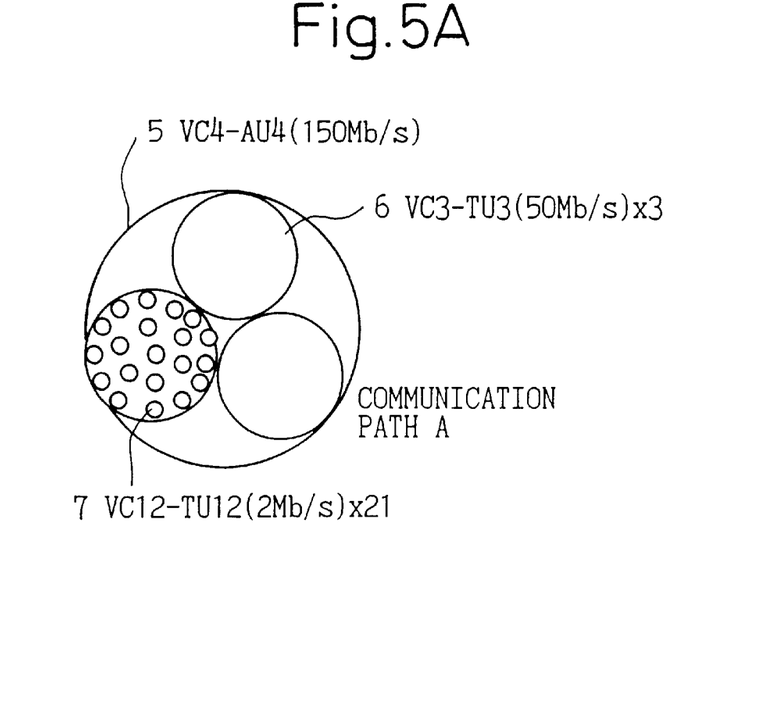
FIG. 5A is a diagram showing a configuration example (1) of the communication path.
Figure 5B:
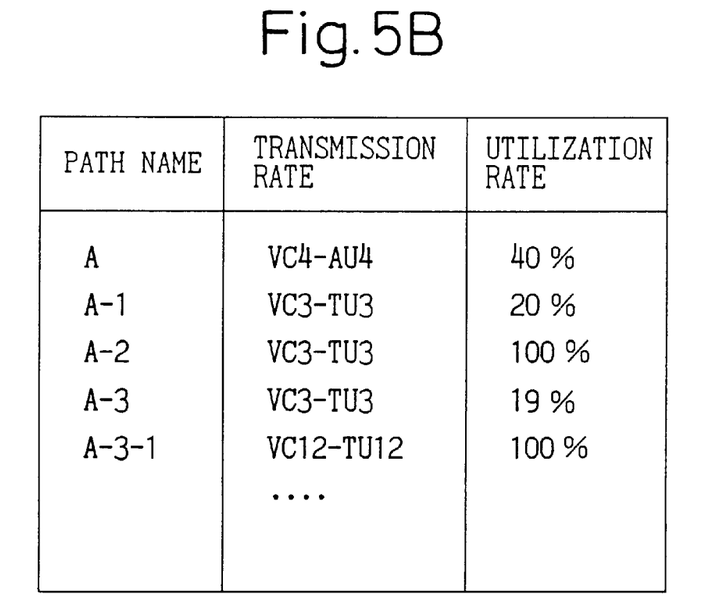
FIG. 5B is a diagram showing a configuration example (2) of the communication path.

An explanation will be given of a first embodiment of the invention, in which the "fault path utilization rate" of FIG. 4 is used as the evaluation function in the case of a fault. FIGS. 5A and 5B show an example of the configuration of the communication path used for the explanation.

As shown in FIG. 2, upon occurrence of a fault in the communication path 11 of the 152M_SDH (VC4-AU4) layer 5, it is detected by the communication path fault receiving unit 21 of the main network management system 1 (S101).

The communication path restoration select unit 22, selects a spare path and the layer having the particular spare path based on the evaluation function of "fault path utilization rate ($\alpha$)". According to this embodiment, in the case where the utilization rate of the faulty communication path is not higher than 50%, it is determined that the fault restoration process is not performed in the same layer having the particular communication path. In the case where the utilization rate is not more than 50%, therefore, the spare path of the same transmission rate is not used.

<Evaluation function 1>

Faulty path utilization rate >= $\alpha$

FIG. 5A diagramatically shows an example configuration of the communication path corresponding to the layers 5 to 7 shown in FIG. 2. One communication path (path A) of the 150M_VC4-AU4 layer corresponds to three communication paths (paths A-1 to A-3) of the 50M_VC3-TU3 layer 6, and one communication path of the 50M_VC3-TU3 layer 6 corresponds to 21 communication paths (paths A-3-1 to A-3-21) of the 2M_VC12-TU12 layer 7.

FIG. 5B shows that the utilization rate of the communication path A, the path A-1 and the path A-3 is not more than 50%. In the event that a fault occurs in any of these communication paths, the client path process (S102 and S103) shown in FIG. 4 is executed. For other paths, the process is performed for switching to a spare path within the same layer as in the prior art (S102 and S104).

For example, the path A has the utilization rate of 40%, and therefore the fault thereof is not restored in the layer 5 but the low-speed paths A-1 to A-3 on the client side for accommodating the faulty path A are searched (S111). In the case under consideration, the utilization rate of the path A-2 is 100%, and therefore the restoration is carried out in the same layer. However, the paths A-1, A-3 of which the utilization rate is less than 50%, and therefore the fault restoration is performed in the path A. This is also the case with the paths accommodated in the paths A-1, A-3, of which those paths less than 50% in utilization rate are searched as restoration paths (S111 to S114). This process is repeated as required thereby to specify the restoration paths to be finally restored (S115 and S116) and the fault restoration is performed using the particular path.

The information on the "utilization rate" of each path is obtained by use of the information of a trail object (Trail) 31 managing the information of the communication path, which is one of information objects 31 to 36 shown in FIG. 3. The "utilization rate" of the paths, as shown by an underline in (A) below, is managed by a traffic item (trafficDescription) in the attribute information of the trail object (Trail) 31. These utilization rate information are updated with the opening/closing of the path.

(A) Example of trail object attribute
   TrailId
   trafficDescription 40
   operationalstate
   directionality
   aEndNWTPList
   zEndNWTPList
   . . .

In similar fashion, the evaluation threshold is managed by the traffic threshold item (trafficThreshold) constituting the attribute information of the layer network domain object (layerNetworkDomain) 32 for managing the network domains in the layer shown in (B) below.

(B) Example of layerNetworkDomain object attribute
   layerNetworkId
   trafficThreshold 50
   . . .

According to the first embodiment of the invention described above, the "utilization rate" which changes with time is used as an evaluation function. In the description that follows, on the other hand, a case which uses the "contract band $\alpha$" constituting a simple fixed value will be referred to as a second embodiment of the invention. Thus, the evaluation function is given as    <Evaluation function 2>
   Contract band of faulty path>=$\alpha$ Assume that a given user has contracted for one communication path 6 (VC3-TU3) in FIG. 5A and four communication paths (VC12-TU12) accommodated in another communication path 6. In this case, the "contract band" in units (VC3-TU3, VC12-TU12) of the communication paths 6 and 7 are 100%, respectively.

On the other hand, the communication path 6 accommodates 21 communication paths 7. In units (VC3-TU3) of the communication path 6, therefore, the contract band of the communication path 6 contracted for the four communication paths 7 is 19% (=4/21×100). In this case, the "contract band" is replaced by the "utilization rate" of the first embodiment so that an efficient fault restoration process is carried out based on the "contract band of faulty path".

Figure 6A:
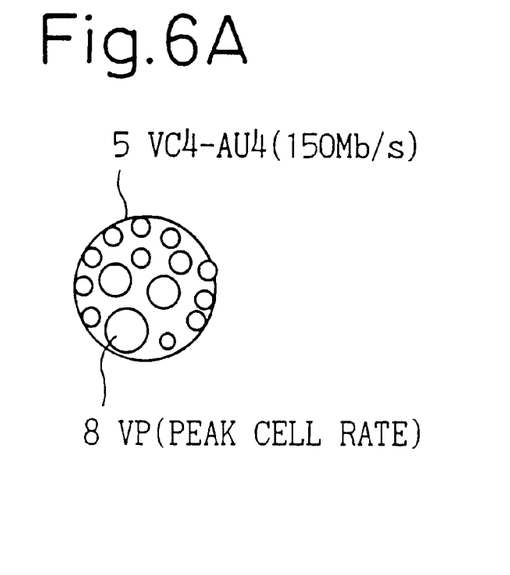
FIG. 6A is a diagram showing another configuration example (1) of the communication path.
Figure 6B:
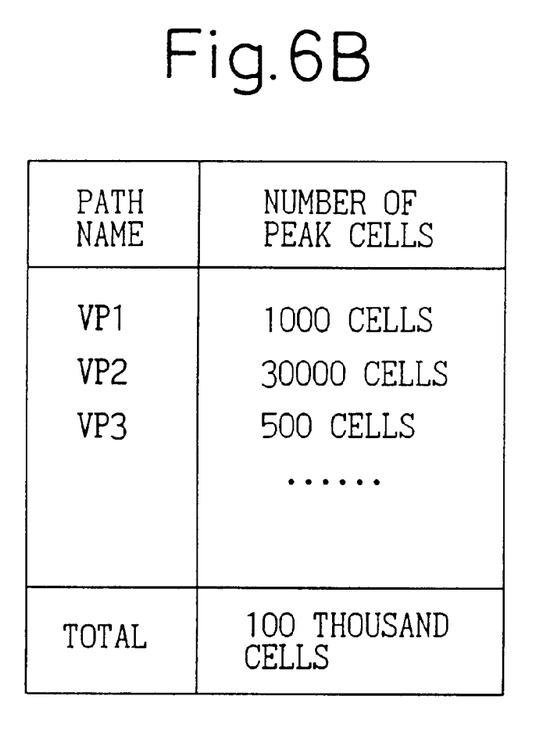
FIG. 6B is a diagram showing another configuration example (2) of the communication path.

FIGS. 6A and 6B show another example of the communication path configuration. With reference to FIGS. 6A and 6B, a third embodiment of the invention will be explained.

In the configuration example of the communication path shown in FIGS. 5A and 5B, a communication path corresponding to the physical transmission rate is used for fault restoration. In the configuration example under consideration, however, the virtual path (VP) is used for the same purpose. As an example, as shown in FIG. 5A, a plurality of virtual paths (VP) 8 for ATM communication are assumed to exist in the communication path 5 of the 150M_SDH (VC4-AU4) layer.

The virtual path 8 has various bands which are managed by the "peak cell rate (PCR)" which is one of the band rules. In the case under consideration, the "peak cell amount $\alpha$" is used as the evaluation function of FIG. 4. Thus, the evaluation function of FIG. 4 is given as follows.

<Evaluation function 3>
   Number of peak cells for all VP>=$\alpha$ As shown in FIG. 6B, for example, assume that the peak cell rate $\alpha$ of all the virtual paths available in the communication path 5 is 100,000 and the peak cell rate threshold ($\alpha$) of the communication path 5 is 200,000 as an evaluation function. The total amount of peak cell rates of the virtual paths 1, 2, 3 and so forth (VP 1, 2, 3 and so forth) fails to reach the threshold value. As a result, the restoration process is not performed in the 150M_SDH (VC4-AU4) layer having the communication path 5 but performed in virtual units in the layer on the client side.

The fourth to seventh embodiments of the invention described below are based on the aforementioned embodiments of the invention but, by adding new evaluation conditions, are intended to realize a more efficient fault restoration process. First, a "number $\beta$ of communication paths for restoration on client side" is used as a new evaluation condition. In such a case, the evaluation function in terms of the first embodiment is given as    <Evaluation function 4>
   Utilization rate of faulty path>=$\alpha$ or
   Number of communication paths for restoration on client side>=$\beta$ One communication path of the 150M_SDH (VC4-AU4) layer can accommodate 63 (=3×21) communication paths of the 2M_SDH (VC12-TU2) layer. As an example, assume that the utilization rate of the communication paths of the 152M_SDH (VC4-AU4) layer is 48% (=30/63×100), and 30 communication paths of the 2M_SDH (VC12-TU12) layer are used. In the case under consideration, the "utilization rate ($\alpha$): 50%" constituting the evaluation function according to the first embodiment is used.

Then, according to the first embodiment in which the utilization rate of the faulty path is 48%, the fault restoration process is not carried out in the same layer, but the path search and the fault restoration are executed on the client side accommodating the faulty path A. In the case where the threshold value of the new evaluation condition "number of communication paths for restoration on client side>$\beta$" is specified as the "number ($\beta$) of paths for restoration on client side=20", however, the number of faulty paths exceeds the number of communication paths for restoration on the client side, and therefore the conditions of the <evaluation function 4> above fail to be satisfied. Thus, according to this embodiment, the path search and the restoration process are not carried out on the client side but in the same layer as the faulty path.

As described above, according to this embodiment, the time required for path search and restoration on the client side is added as an evaluation factor. As a result, the physically available capacity of the communication path and the fault restoration processing time are evaluated overall, and the fault restoration process is carried out taking both the efficient operation of the spare paths and the prevention of fault expansion by faster fault handling into account. By the way, the "number of communication paths for restoration on client side>=β" in the evaluation function described above can be used as an independent evaluation function for the first embodiment.

According to a fifth embodiment of the invention, a new attribute information "alternative path construction possibility information (Xinfo attribute)" is added to the layer network domain object (LND) 32 described above as a new evaluation condition. An example is shown in (B') below.

(B') Example of layerNetworkDomain object attribute
 layerNetworkId
 trafficThreshold 50
 XCinfo=False
 . . .

Figure 7:
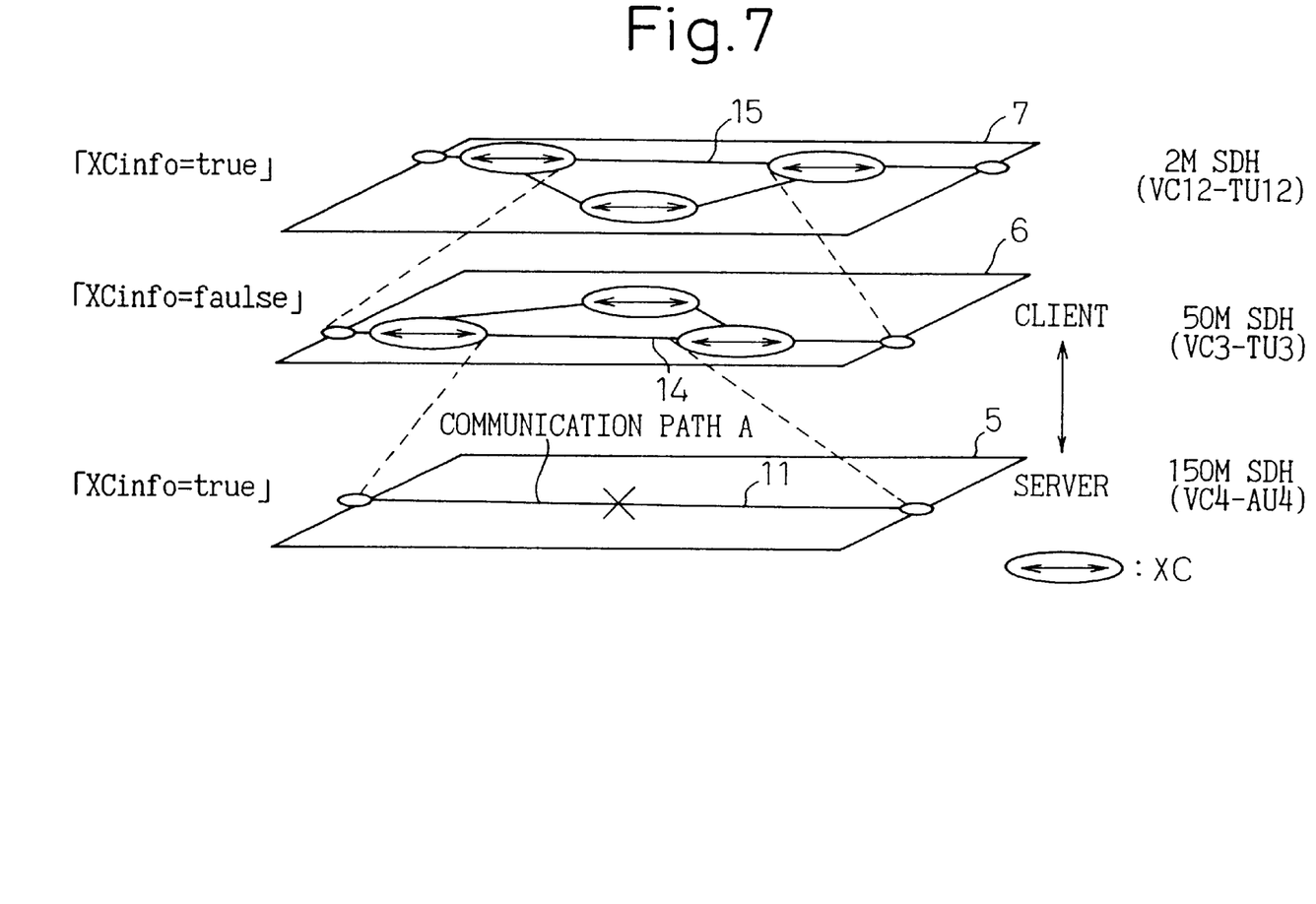
FIG. 7 is a diagram showing an example of the fault restoration process using the XCinfo attribute.

FIG. 7 shows an example of the fault restoration process using the XCinfo attribute.

First, assume that a fault of the communication path 11 occurs in the VC4-AU4 layer 5. The alternative path construction possibility information of the layer is "XCinfo=true". In the case where the "evaluation function" described above selects another layer, therefore, the path search and the fault restoration process are transferred to the client side. In the VC3-TU3 layer 6 at the destination, an alternative path covering the layers is prohibited by the alternative path construction possibility information "XCinfo=false". As a result, the path search and the fault restoration process are transferred further to the VC12-TU12 layer 7 on client side. The VC12-TU12 layer 7 satisfies "XCinfo=true", and therefore the path search and the fault restoration process are started in the particular layer.

According to a sixth embodiment of the invention, priority information (priority attribute) is set as a new evaluation condition in the trail object (Trail) 31. For example, the values 1 to 5 (5: high, 1: low) are assigned to the priority information, among which the "priority value of 5" highest in priority can be defined to restore only the communication path fault ranking at 5 in priority value of all the extracted paths accommodated in the faulty path.

An example of the priority information is shown in (A') below.

(A') Example of trail object attribute
 TrailId
 trafficDescription 40
 priority 5
 . . .

The embodiments described above all refer to the case in which the fault restoration process is performed in the same layer as the faulty communication path or in the layers lower in speed on client side at the time of a line fault. In a seventh embodiment described below, on the other hand, a high-speed layer on server side is selected under certain conditions thereby making it possible to perform the line fault restoration process more efficiently and flexibly.

Figure 8:
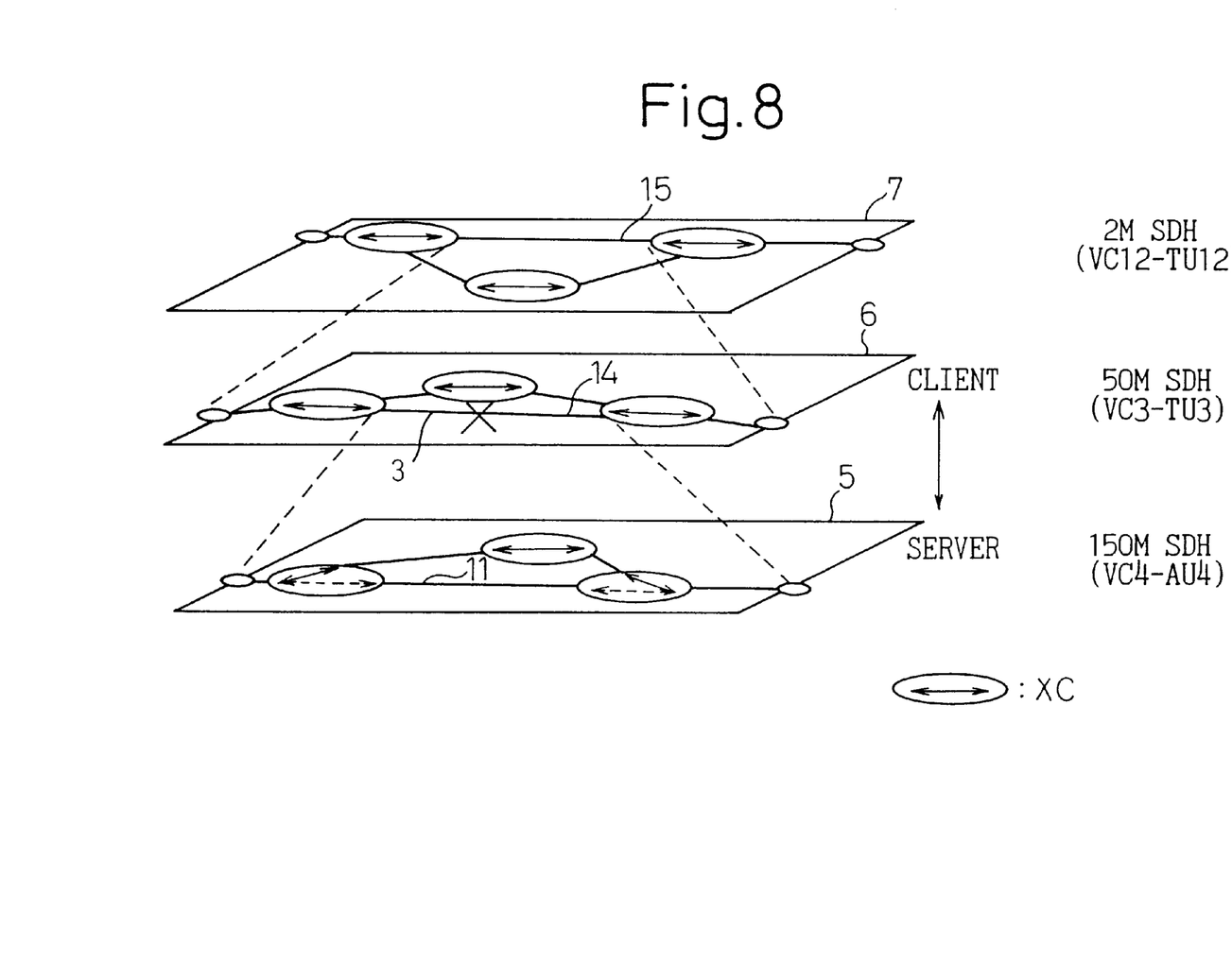
FIG. 8 is a diagram showing an example of the line fault process in case of a fault in a plurality of lines.

FIG. 8 shows an example of the line fault processing performed at the time of a plurality of line faults.

FIG. 8 represents the case in which a fault such as the quality deterioration has occurred in three communication paths on the 50M_SDH (VC3-TU3) layer 6 on client side accommodated in the 150M_SDH (VC4-AU4) layer 5 on server layer side. In the case where a communication path fault is detected in a plurality of (x) communication paths at the same time as described above, the fault restoration is performed in the high-speed layer 5 on server side using the following evaluation function.

<Evaluation function>
Number of detected faulty layer paths>=x

According to this embodiment, a plurality of communication paths which may occur on the client side can be switched to one spare path on server side or a smaller number of spare paths which can accommodate all of them collectively. Therefore, a more efficient use of spare paths with a smaller delay becomes possible than when the fault restoration is performed in the same layer or in the layers on client side lower in speed.

As described above, by applying the fourth to seventh embodiments to the first to third embodiments described above, a line fault restoration process is made possible in a way more flexibly and efficiently meeting the traffic conditions of the communication path, the layered network structure and the degree of importance of the lines. Also, the fourth to seventh embodiments of the invention can of course be implemented independently.

Figure 9:
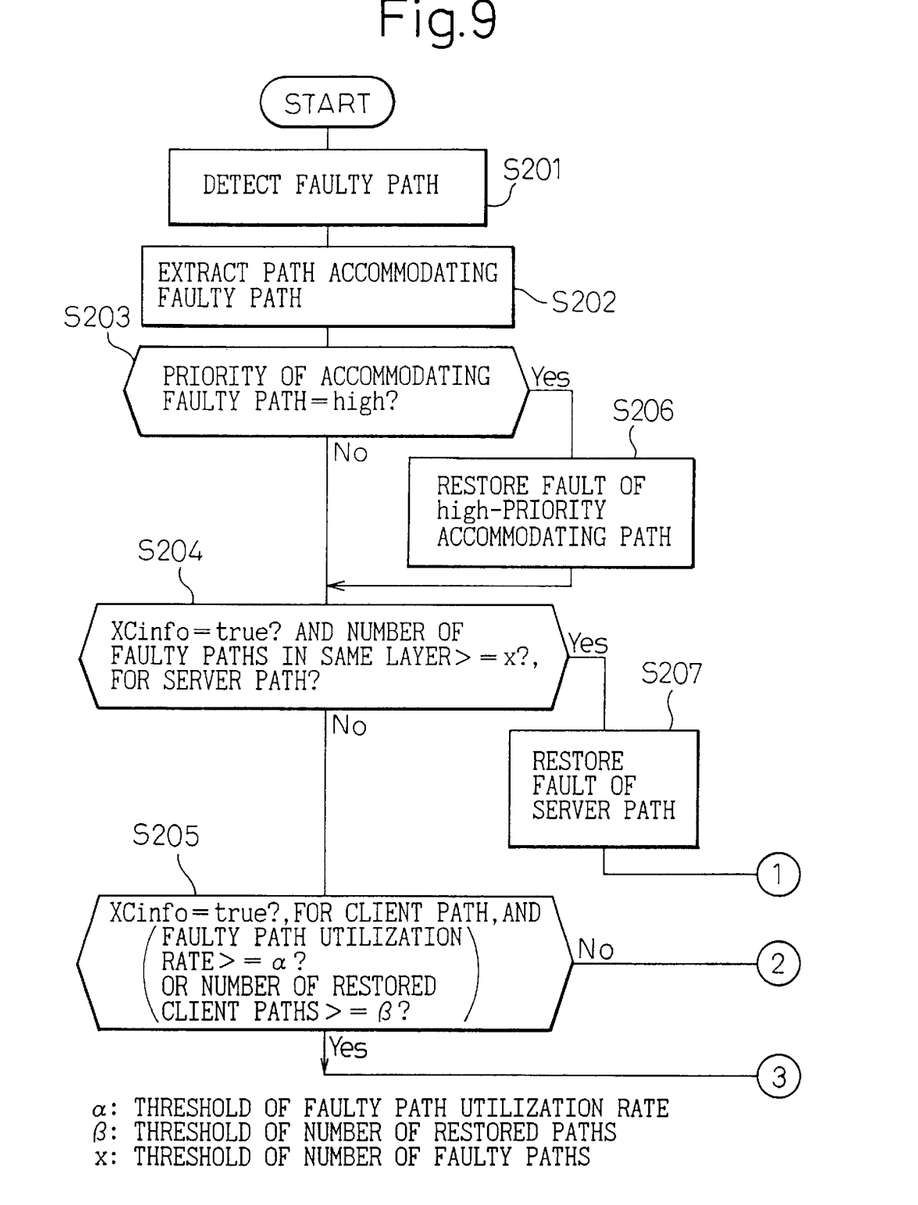
FIG. 9 is a diagram showing an example (1) of the fault restoration flow in a combination of embodiments.
Figure 10:
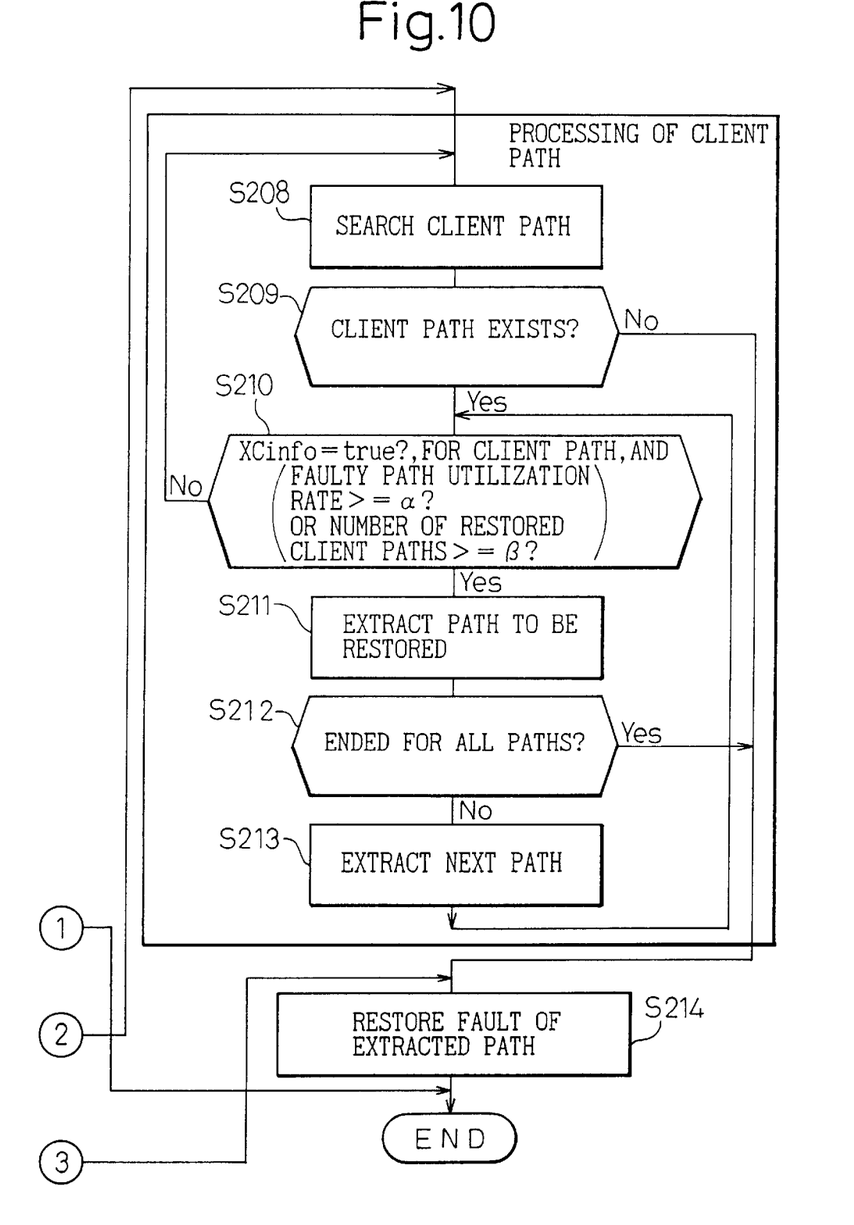
FIG. 10 is a diagram showing an example (2) of the fault restoration flow in a combination of embodiments.

FIGS. 9 and 10 show an example of the fault restoration flow realizing an efficient, rapid line fault restoration process by appropriately combining the embodiments of the invention described above.

In this example, the priority of the accommodation path is determined first by the detection of a faulty path (S201 to S203). For a path of high priority, the fault restoration process is performed in priority (S206), while the attribute information XCinfo on server side and the evaluation function "number of faults in same layer>=x" are used for determination for other paths (S204).

In the case where the attribute information is "XCinfo=true" showing that the fault restoration is possible between layers and faults are detected in at least x communication paths, then the line restoration process is performed on server side (S207). In the case where this condition fails to be met, on the other hand, the attribute information Cinfo on the client side and the evaluation function "utilization rate of faulty path>=α or number of communication paths for restoration on the client side>=β" are determined (S205).

On the client side, a client path is searched (S208), and in similar manner, the attribute information Cinfo and the evaluation function "utilization rate of faulty path>=α or number of communication paths for restoration on the client side>=β" are determined for the client path (S209 to S213). As a result, a client path for which the most efficient and most rapid processing is possible is extracted and the fault restoration process is performed (S214).

As described above, according to this invention, the faulty path restoration process is made possible between layers taking into full consideration both the utilization rate and the restoration time of a communication path having a multiple layered structure.

Also, according to this invention, in the event of a fault in a communication path, the determination for selection of the restoration process can be made efficiently, flexibly and rapidly using various evaluation functions including the traffic of the faulty path, the peak traffic, the availability of spare paths, the possibility of fault restoration, line importance degree, number of faulty paths, etc.

What is claimed is:

1. A communication path fault restoration system for a communication network including communications paths having a multiple layered structure, comprising:
 a communication path fault receiving unit for detecting a faulty path in accordance with collected network information;
 a communication path restoration select unit for selecting one communication layer different from a communication layer having the faulty path from multiple communication layers and a communication path on the selected communication layer for dynamic fault restoration of the faulty path without preparing a spare path thereof, by calculating the value of a predetermined evaluation function based on information for said faulty path; and a communication path restoration processing unit for performing the fault restoration of said faulty path using the communication path on the selected communication layer.

2. A system according to claim 1, wherein said evaluation function determines selectively whether the fault restoration process is performed in the same layer as said faulty path or using a path of another layer accommodating said faulty path.

3. A system according to claim 2, wherein said evaluation function makes said determination according to the traffic utilization rate of the faulty path, and selects the fault restoration process by a path in the layer on the client side in the case where said utilization rate is not more than a predetermined threshold value.

4. A system according to claim 2, wherein said communication path restoration select unit includes an alternative path construction possibility information and said evaluation function selects another layer in the case where said alternative path construction possibility information is negative.

5. A communication path fault restoration system for a communication network including communications paths having a multiple layered structure, comprising:

a communication path fault receiving unit for detecting a faulty path in accordance with collected network information;

a communication path restoration select unit for selecting one communication layer from multiple communication layers and a communication path on the selected communication layer for dynamic fault restoration of the faulty path without preparing a spare path thereof, by calculating the value of a predetermined evaluation function based on information for said faulty path; and a communication path restoration processing unit for performing the fault restoration of said faulty path using the communication path on the selected communication layer;

wherein said evaluation function determines selectively whether the fault restoration process is performed in the same layer as said faulty path or using a path of another layer accommodating said faultt path, and wherein said communication path restoration select unit further includes priority information assigned to each communication path, and said evaluation function selects the process in the same layer in priority against a communication path fault high in priority.

6. A communication path fault restoration system for a communication network including communications paths having a multiple layered structure, comprising:

a communication path fault receiving unit for detecting a faulty path in accordance with collected network information;

a communication path restoration select unit for selecting one communication layer different from a communication layer having the faulty path from multiple communication layers and a communication path on the selected communication layer for dynamic fault restoration of the faulty path without preparing a spare path thereof, by calculating the value of a predetermined evaluation function based on information for said faulty path; and a communication path restoration processing unit for performing the fault restoration of said faulty path using the communication path on the selected communication layer;

wherein said communication path restoration select unit repeats the determination using said evaluation function on said selected communication layer thereby to further select one communication layer from the multiple communication layers and a communication path on the further selected communication layer.

7. A system according to claim 6, wherein said evaluation function selectively determines whether the fault restoration process is performed within the same layer as the faulty path or using a path of another layer accommodating said faulty path.

8. A system according to claim 7, wherein said evaluation function makes said determination according to the traffic utilization rate of said faulty path and in the case where said utilization rate is not higher than a predetermined threshold value, selects the fault restoration process using a path of the layer on the client side.

9. A system according to claim 7, wherein said communication path restoration select unit further has an alternative path construction possibility information and said evaluation function selects another layer in the case where said alternative path construction possibility information is negative.

10. A communication path fault restoration system for a communication network including communications paths having a multiple layered structure, comprising:

a communication path fault receiving unit for detecting a faulty path in accordance with collected network information;

a communication path restoration select unit for selecting one communication layer from multiple communication layers and a communication path on the selected communication layer for dynamic fault restoration of the faulty path without preparing a spare path thereof, by calculating the value of a predetermined evaluation function based on information for said faulty path; and a communication path restoration processing unit for performing the fault restoration of said faulty path using the communication path on the selected communication layer;

wherein said communication path restoration select unit repeats the determination using said evaluation function on said selected communication layer thereby to further select one communication layer from the multiple communication layers and a communication path on the further selected communication layer;

wherein said evaluation function selectively determines whether the fault restoration process is performed within the same layer as the faulty path or using a path of another layer accommodating said faulty path, wherein said evaluation function makes said determination according to the traffic utilization rate of said faulty path and in the case where said utilization rate is not higher than a predetermined threshold value, selects the fault restoration process using a path of the layer on the client side, and wherein said utilization rate contains the peak cell rate for the ATM communication.

11. A communication path fault restoration system for a communication network including communications paths having a multiple layered structure, comprising:

a communication path fault receiving unit for detecting a faulty path in accordance with collected network information;

a communication path restoration select unit for selecting one communication layer from multiple communication layers and a communication path on the selected communication layer for dynamic fault restoration of the faulty path without preparing a spare path thereof, by calculating the value of a predetermined evaluation function based on information for said faulty path; and a communication path restoration processing unit for performing the fault restoration of said faulty path using the communication path on the selected communication layer;

wherein said communication path restoration select unit repeats the determination using said evaluation function on said selected communication layer thereby to further select one communication layer from the multiple communication layers and a communication path on the further selected communication layer;

wherein said evaluation function selectively determines whether the fault restoration process is performed within the same layer as the faulty path or using a path of another layer accommodating said faulty path, wherein said evaluation function makes said determination according to the traffic utilization rate of said faulty path and in the case where said utilization rate is not higher than a predetermined threshold value, selects the fault restoration process using a path of the layer on the client side, and further comprising means for invalidating said selection on the client side and performing the fault restoration process within the same layer as said faulty path in the case where the number of paths to be restored on the client side is not lower than a predetermined value.

12. A communication path fault restoration system for a communication network including communications paths having a multiple layered structure, comprising:

a communication path fault receiving unit for detecting a faulty path in accordance with collected network information;

a communication path restoration select unit for selecting one communication layer from multiple communication layers and a communication path on the selected communication layer for dynamic fault restoration of the faulty path without preparing a spare path thereof, by calculating the value of a predetermined evaluation function based on information for said faulty path; and a communication path restoration processing unit for performing the fault restoration of said faulty path using the communication path on the selected communication layer;

wherein said communication path restoration select unit repeats the determination using said evaluation function on said selected communication layer thereby to further select one communication layer from the multiple communication layers and a communication path on the further selected communication layer;

wherein said evaluation function selectively determines whether the fault restoration process is performed within the same layer as the faulty path or using a path of another layer accommodating said faulty path, and wherein said evaluation function further selects a path on server side in the case where a plurality of faults exceeding a predetermined number occur.

13. A communication path fault restoration system for a communication network including communications paths having a multiple layered structure, comprising:

a communication path fault receiving unit for detecting a faulty path in accordance with collected network information;

a communication path restoration select unit for selecting one communication layer from multiple communication layers and a communication path on the selected communication layer for dynamic fault restoration of the faulty path without preparing a spare path thereof, by calculating the value of a predetermined evaluation function based on information for said faulty path; and a communication path restoration processing unit for performing the fault restoration of said faulty path using the communication path on the selected communication layer;

wherein said communication path restoration select unit repeats the determination using said evaluation function on said selected communication layer thereby to further select one communication layer from the multiple communication layers and a communication path on the further selected communication layer;

wherein said evaluation function selectively determines whether the fault restoration process is performed within the same layer as the faulty path or using a path of another layer accommodating said faulty path, and wherein said communication path restoration select unit further has the priority information assigned to each communication path, and said evaluation function selects the process within the same layer in priority against a communication path fault high in priority.

14. A communication path fault restoration system for a communication network including communications paths having a multiple layered structure, comprising:

a communication path fault receiving unit for detecting a faulty path in accordance with the network collection information;

a communication path restoration select unit for selecting a communication layer and a communication path on said layer for dynamic fault restoration of the faulty path based on the determination of the information on said faulty path using a predetermined evaluation function; and a communication path restoration processing unit for performing the fault restoration of said faulty path using the communication path on the selected communication layer;

wherein said evaluation function determines selectively whether the fault restoration process is performed in the same layer as said faulty path or using a path of another layer accommodating said faulty path;

wherein said evaluation function makes said determination according to the traffic utilization rate of the faulty path, and selects the fault restoration process by a path in the layer on the client side in the case where said utilization rate is not more than a predetermined threshold value; and wherein said utilization rate includes the ratio in which the band contracted by the user represents all the bands.

15. A communication path fault restoration system for a communication network including communications paths having a multiple layered structure, comprising:

a communication path fault receiving unit for detecting a faulty path in accordance with the network collection information;

a communication path restoration select unit for selecting a communication layer and a communication path on said layer for dynamic fault restoration of the faulty path based on the determination of the information on said faulty path using a predetermined evaluation function; and a communication path restoration processing unit for performing the fault restoration of said faulty path using the communication path on the selected communication layer;

wherein said evaluation function determines selectively whether the fault restoration process is performed in the same layer as said faulty path or using a path of another layer accommodating said faulty path;

wherein said evaluation function makes said determination according to the traffic utilization rate of the faulty path, and selects the fault restoration process by a path in the layer on the client side in the case where said utilization rate is not more than a predetermined threshold value; and wherein said utilization rate includes the peak cell rate for the ATM communication.

16. A communication path fault restoration system for a communication network including communications paths having a multiple layered structure, comprising:

a communication path fault receiving unit for detecting a faulty path in accordance with the network collection information;

a communication path restoration select unit for selecting a communication layer and a communication path on said layer for dynamic fault restoration of the faulty path based on the determination of the information on said faulty path using a predetermined evaluation function; and a communication path restoration processing unit for performing the fault restoration of said faulty path using the communication path on the selected communication layer;

wherein said evaluation function determines selectively whether the fault restoration process is performed in the same layer as said faulty path or using a path of another layer accommodating said faulty path;

wherein said evaluation function makes said determination according to the traffic utilization rate of the faulty path, and selects the fault restoration process by a path in the layer on the client side in the case where said utilization rate is not more than a predetermined threshold value; and further comprising means for invalidating the selection on the client side and performing the fault restoration process in the same layer as the faulty path in the case where the number of paths to be restored on the client side is not less than a predetermined value.

17. A communication path fault restoration system for a communication network including communications paths having a multiple layered structure, comprising:

a communication path fault receiving unit for detecting a faulty path in accordance with the network collection information;

a communication path restoration select unit for selecting a communication layer and a communication path on said layer for dynamic fault restoration of the faulty path based on the determination of the information on said faulty path using a predetermined evaluation function; and a communication path restoration processing unit for performing the fault restoration of said faulty path using the communication path on the selected communication layer;

wherein said evaluation function determines selectively whether the fault restoration process is performed in the same layer as said faulty path or using a path of another layer accommodating said faulty path; and wherein said evaluation function selects a path on the server.

18. A communication path fault restoration system for a communication network including communications paths having a multiple layered structure, comprising:

a communication path fault receiving unit for detecting a faulty path in accordance with the network collection information;

a communication path restoration select unit for selecting a communication layer and a communication path on said layer for dynamic fault restoration of the faulty path based on the determination of the information on said faulty path using a predetermined evaluation function; and a communication path restoration processing unit for performing the fault restoration of said faulty path using the communication path on the selected communication layer;

wherein said communication path restoration select unit repeats the determination using said evaluation function for said selected communication layer to thereby select a communication layer and the communication path on said layer for restoring the fault of said faulty path;

wherein said evaluation function selectively determines whether the fault restoration process is performed within the same layer as the faulty path or using a path of another layer accommodating said faulty path;

wherein said evaluation function makes said determination according to the traffic utilization rate of said faulty path and in the case where said utilization rate is not higher than a predetermined threshold value, selects the fault restoration process using a path of the layer on the client side; and wherein said utilization rate contains the ratio in which the band contracted by the user represents all of the bands.

* * * * *